(12) United States Patent
Lee et al.

(10) Patent No.: US 10,035,544 B2
(45) Date of Patent: Jul. 31, 2018

(54) SHOCK-ABSORBING UNIT, MANUFACTURING METHOD THEREOF, AND MEMBER CONNECTION STRUCTURE

(71) Applicant: Hyundai Motor Company, Seoul (KR)

(72) Inventors: Sang Heon Lee, Seoul (KR); Chang Dong Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/352,067

(22) Filed: Nov. 15, 2016

(65) Prior Publication Data

US 2018/0009481 A1    Jan. 11, 2018

(30) Foreign Application Priority Data

Jul. 5, 2016   (KR) .................. 10-2016-0084964

(51) Int. Cl.
    *B62D 21/15*   (2006.01)
    *B62D 25/02*   (2006.01)
    *B62D 29/04*   (2006.01)
    *B62D 65/00*   (2006.01)

(52) U.S. Cl.
    CPC ......... *B62D 21/157* (2013.01); *B62D 25/025* (2013.01); *B62D 29/041* (2013.01); *B62D 65/00* (2013.01)

(58) Field of Classification Search
    CPC .... B62D 21/157; B62D 25/02; B62D 25/025; B62D 29/041; B62D 29/048; B62D 65/00
    USPC ............... 296/203.03, 187.12, 209
    See application file for complete search history.

(56) References Cited

U.S. PATENT DOCUMENTS

| | | | | |
|---|---|---|---|---|
| 6,478,367 B2 * | 11/2002 | Ishikawa | ............... | B62D 25/04 296/199 |
| 9,493,190 B1 * | 11/2016 | Alwan | ................. | B62D 21/157 |
| 2002/0033618 A1 * | 3/2002 | Kwon | ................... | B62D 25/04 296/203.03 |
| 2010/0207426 A1 * | 8/2010 | Tsuruta | ............... | B62D 21/157 296/187.12 |
| 2014/0084635 A1 * | 3/2014 | Matsuda | ............... | B62D 25/02 296/205 |
| 2016/0229456 A1 * | 8/2016 | Boettcher | ........... | B62D 25/025 |
| 2016/0236715 A1 * | 8/2016 | Kurokawa | ......... | B62D 25/2045 |

(Continued)

FOREIGN PATENT DOCUMENTS

| | | | | |
|---|---|---|---|---|
| DE | 4335043 | * | 4/1995 | ......... B62D 25/025 |
| JP | 2012-76570 A | | 4/2012 | |

(Continued)

*Primary Examiner* — Gregory A Blankenship
(74) *Attorney, Agent, or Firm* — Morgan, Lewis & Bockius LLP

(57) ABSTRACT

A shock-absorbing unit may include a reinforcement part made of a composite material, which has a panel shape, two opposing end portions of which are connected to the inner panel to divide the inner space into a separation space adjacent to the outer panel and a partition space adjacent to the inner panel, and which has a coupling protrusion protruding from the inner surface thereof toward the inner panel, and a shock-absorbing part made of a composite material, which has a coupling recess formed in one side thereof to receive the coupling protrusion so as to be connected to the reinforcement part in the partition space, and the opposite side of which is connected to the inner surface of the inner panel and is supported by the inner panel.

10 Claims, 5 Drawing Sheets

30(31,32)

(56) References Cited

U.S. PATENT DOCUMENTS

| | | | |
|---|---|---|---|
| 2017/0015357 A1* | 1/2017 | Mukainakano | B62D 25/04 |
| 2017/0144706 A1* | 5/2017 | Bach | B62D 25/025 |
| 2017/0203796 A1* | 7/2017 | Belpaire | B62D 29/002 |
| 2017/0217498 A1* | 8/2017 | Akhlaque-e-rasul | B62D 21/157 |

FOREIGN PATENT DOCUMENTS

| | | |
|---|---|---|
| KR | 20-0197184 Y1 | 10/2000 |
| KR | 10-2011-0121224 A | 11/2011 |
| KR | 10-2014-0043318 A | 4/2014 |

\* cited by examiner

SHOCK-ABSORBING UNIT, MANUFACTURING METHOD THEREOF, AND MEMBER CONNECTION STRUCTURE

CROSS-REFERENCE TO RELATED APPLICATION

The present application claims priority to Korean Patent Application No. 10-2016-0084964, filed on Jul. 5, 2016, the entire contents of which is incorporated herein for all purposes by this reference.

BACKGROUND OF THE INVENTION

Field of the Invention

The present invention relates to a shock-absorbing unit, which is configured for increasing the coupling force between components using the coupling between a coupling recess and a coupling protrusion, and which is configured for absorbing shock energy.

Description of Related Art

In the case of a vehicle body made of a steel material, a plurality of collision members for increasing rigidity is provided in the inner space of a side sill via welding in order to improve collision resistance performance. Also, in the case of a vehicle body made of a composite material, an additional structure is provided in the side sill via bonding using an adhesive in order to increase rigidity.

However, a structure that is merely bonded to the side sill using an adhesive cannot sufficiently perform the shock-absorbing function due to insufficient coupling force. To solve this problem, a shock-absorbing unit having improved coupling force through coupling between a coupling protrusion and a coupling recess has been proposed. Further, this shock-absorbing unit is constituted to have a uniform closed section in order to improve productivity and mechanical properties, and is capable of being produced through a drawing process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shock-absorbing unit that is configured for increasing the coupling force between components using the coupling between a coupling recess and a coupling protrusion and that is configured for absorbing shock energy.

In accordance with an aspect of the present invention, the above and other objects can be accomplished by the provision of a shock-absorbing unit disposed in an inner space defined by an outer panel and an inner panel, the shock-absorbing unit including a reinforcement part made of a composite material, the reinforcement part having a panel shape, having two opposing end portions connected to the inner panel to divide the inner space into a separation space adjacent to the outer panel and a partition space adjacent to the inner panel, and having a coupling protrusion protruding from an inner surface thereof toward the inner panel, and a shock-absorbing part made of a composite material, the shock-absorbing part having a coupling recess formed in a first side thereof to receive the coupling protrusion to be connected to the reinforcement part in the partition space and having an opposite side connected to an inner surface of the inner panel to be supported by the inner panel.

The shock-absorbing part may be hollow to form an independent space therein, and the shock-absorbing unit may further include a support part disposed in the independent space and connected integrally or monolithically with the shock-absorbing part to divide the independent space into unit spaces.

The shock-absorbing part may include a first inner surface having an indented portion extending in an inward direction of the independent space corresponding to the coupling recess, a second inner surface positioned opposite to the first inner surface 220 while being spaced apart from the first inner surface toward the inner panel, and a pair of connection inner surfaces connecting two opposing ends of the first inner surface and two opposing ends of the second inner surface to form the independent space.

The support part may include a first support body connecting the indented portion in the first inner surface and the second surface facing the indented portion, and a second support body intersecting the first support body and connecting the pair of connection inner surfaces.

The shock-absorbing part may be formed in a tube shape having a predetermined section, may extend along a longitudinal direction of the outer panel, the inner panel and the reinforcement part, and may have a first side having an outer surface contacting an inner surface of the reinforcement part and an opposite side having an outer surface contacting an inner surface of the inner panel.

The support part may be configured as a plurality of panels arranged to intersect each other, may extend along a longitudinal direction of the outer panel, the inner panel and the reinforcement part, and may have ends connected to inner surfaces of the shock-absorbing part.

The shock-absorbing unit may further include a reinforcement panel connected to a connection portion between the outer panel and the inner panel and to an outer surface of the reinforcement part.

In accordance with another aspect of the present invention, there is provided a member connection structure including a first member including an outer panel, an inner panel, and an inner space defined by the outer panel and the inner panel, a shock-absorbing unit including a reinforcement part made of a composite material, the reinforcement part having a panel shape, having two opposing end portions connected to the inner panel to divide the inner space of the first member into a separation space adjacent to the outer panel and a partition space adjacent to the inner panel, and having a coupling protrusion protruding from an inner surface thereof toward the inner panel, a shock-absorbing part made of a composite material, the shock-absorbing part having a coupling recess formed to receive the coupling protrusion to be connected to the reinforcement part in the partition space and being hollow to form an independent space therein, and a support part disposed in the independent space and connected integrally or monolithically with the shock-absorbing part to divide the independent space into unit spaces, and a second member having a plurality of fastening portions formed at a first end portion thereof and connected to the first member such that the each of the fastening portions is inserted into a corresponding one of the unit spaces.

The fastening portions may be contacted and secured to inner surfaces of the shock-absorbing part and the support part using an adhesive.

In accordance with a further aspect of the present invention, there is provided a method of manufacturing a shock-absorbing unit disposed in an inner space defined by an outer panel and an inner panel, the method including forming a reinforcement part of a composite material using reinforced fiber and resin so that the reinforcement part may have a panel shape and may have a coupling protrusion protruding from an inner surface thereof, integrally or monolithically forming a shock-absorbing part of a composite material so that the shock-absorbing part may have a coupling recess formed to receive the coupling protrusion and is hollow to form an independent space therein, and a support part disposed in the independent space and connected integrally or monolithically with the shock-absorbing part to divide the independent space into unit spaces, and coupling the reinforcement part and the shock-absorbing part through coupling between the coupling protrusion and the coupling recess.

The integrally forming may include drawing reinforced fiber so that a sectional shape made by the shock-absorbing part and the support part is uniform, and impregnating resin into the drawn reinforced fiber.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
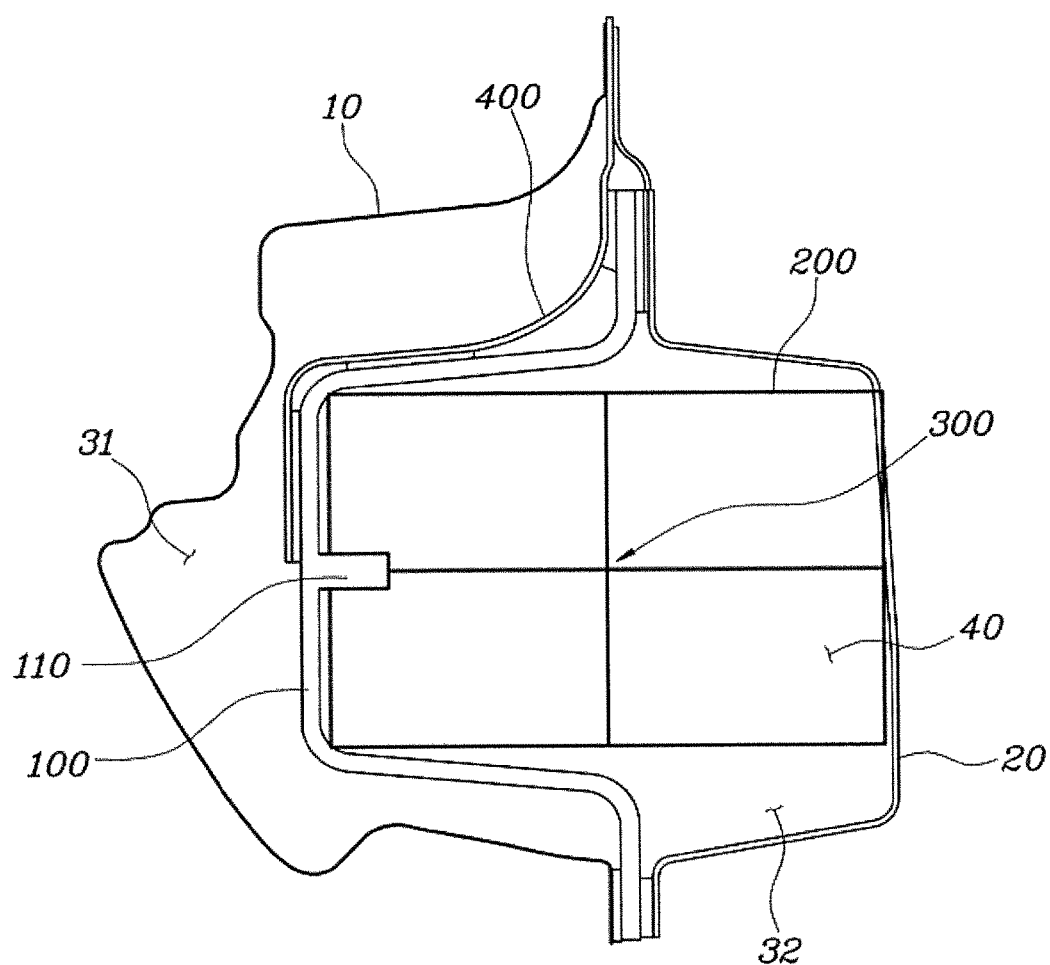
FIG. 1 is a view showing a section of a shock-absorbing unit disposed in an outer panel and an inner panel according to one embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
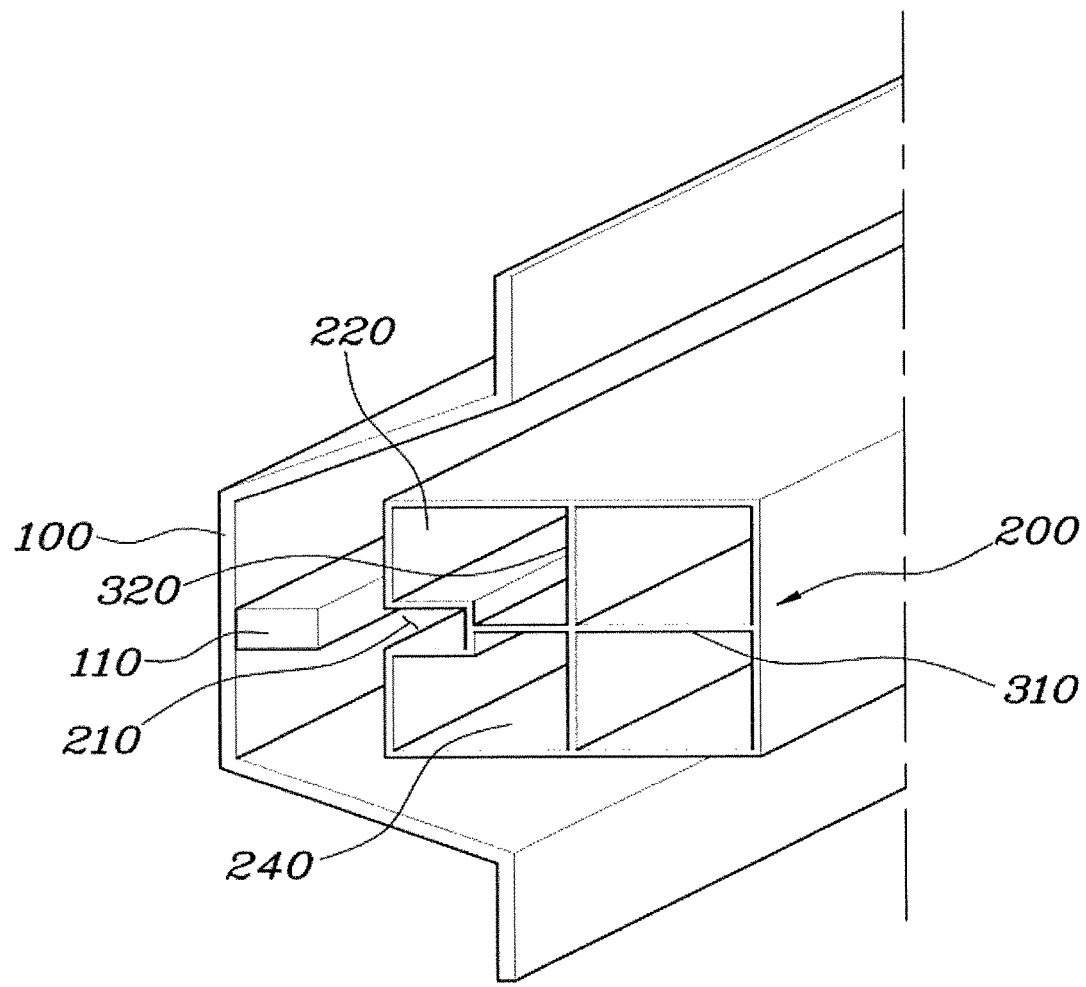
FIG. 2 is a view showing the connection between a reinforcement part and a shock-absorbing part according to one embodiment of the present invention.

Referring to FIGS. FIG. 1 and FIG. 2, a shock-absorbing unit according to an exemplary embodiment of the present invention, which is disposed in an inner space 30 defined by an outer panel 10 and an inner panel 20, includes: a reinforcement part 100, which has a panel shape and is made of a composite material, two opposing end portions of which are connected to the inner panel 20 to divide the inner space 30 into a separation space 31 adjacent to the outer panel 10 and a partition space 32 adjacent to the inner panel 20, and which has a coupling protrusion 110 protruding from the inner surface thereof toward the inner panel 20; and a shock-absorbing part 200, which is made of a composite material and has a coupling recess 210 formed in a first side thereof to receive the coupling protrusion 110 to be connected to the reinforcement part 100 in the partition space 32, and the opposite side of which is connected to the inner surface of the inner panel 20 and is supported by the inner panel 20.

The outer panel 10 and the inner panel 20 may constitute a member of the vehicle, more particularly, a member like a side sill, and form the inner space 30 therebetween. An additional unit for absorbing external shocks due to collisions may be disposed in the inner space 30.

The reinforcement part 100 is formed in a panel shape, like the outer panel 10 and the inner panel 20. Two opposing end portions of the reinforcement part 100 may be connected to the inner panel 20, and the middle portion may be formed to be bent toward the outer panel 10, thereby forming a space therein. Accordingly, the inner space 30, which is defined by the outer panel 10 and the inner panel 20, is divided into the separation space 31 adjacent to the outer panel 10 and the partition space 32 adjacent to the inner panel 20. The two opposing end portions of the reinforcement part 100 may be connected to connection portions between the outer panel 10 and the inner panel 20 to ensure firm connection of the reinforcement part 100. The two opposing end portions of the reinforcement part 100 may be fixedly bonded between the outer panel 10 and the inner panel 20 using an adhesive.

The separation space 31 is a space defined by the inner surface of the outer panel 10 and the outer surface of the reinforcement part 100, and the partition space 32 is a space defined by the inner surface of the inner panel 20 and the inner surface of the reinforcement part 100.

The reinforcement part 100 may have a protrusion protruding from the inner surface thereof, which faces the inner surface of the inner panel 20, toward the inner surface of the inner panel 20.

By mounting the reinforcement part 100 to the inner panel 20 to form the partition space 32 in the inner space 30, a space for accommodating the shock-absorbing part 200, which will be described later, is provided.

The reinforcement part 100 is formed of a composite material including reinforced fiber and resin. The reinforced fiber may include at least one of carbon fiber, glass fiber and natural fiber. However, the embodiment is not limited thereto. The resin may include at least one of thermosetting resin and thermoplastic resin.

The shock-absorbing part 200 is disposed in the partition space 32, which is defined by the reinforcement part 100 and the inner panel 20, and may have a coupling recess 210 formed to be indented inward from a first side of the shock-absorbing part 200. Through the coupling of the coupling recess 210 to the coupling protrusion 110, mechanical engagement between the reinforcement part 100 and the shock-absorbing part 200 is achieved. The coupling recess 210 may be formed to have a shape corresponding to the coupling protrusion 110.

The opposite side of the shock-absorbing part 200 is supported by the inner panel 20, so that the two opposing sides thereof are respectively connected to the reinforcement part 100 and the inner panel 20. As such, the shock-absorbing part 200 is fixedly disposed in the partition space 32.

When the shock-absorbing part 200 is disposed in the separation space 31, which is defined by the reinforcement part 100 and the outer panel 10, the coupling protrusion 110 of the reinforcement part 100 will be formed toward the outer panel 10. In this case, shock energy is directly transmitted from the outer panel 10 to the shock-absorbing part 200, and is then transmitted to the reinforcement part 100. However, this structure may have a disadvantage in that the function of the reinforcement part 100, which is required first to receive shock energy and second to disperse the shock energy to the shock-absorbing part 200, cannot be performed.

Therefore, it is preferable that the shock-absorbing part 200 be disposed in the partition space 32, which is defined by the reinforcement part 100 and the inner panel 20, so that shock energy is sequentially transmitted from an outside to the outer panel 10, the reinforcement part 100 and the shock-absorbing part 200, and accordingly it is preferable that the coupling protrusion 110 be formed to protrude from the inner surface of the reinforcement part 100 toward the inner panel 20.

When the shock applied to the outer panel 10 from an outside is transmitted to the shock-absorbing part 200 via the reinforcement part 100, as much shock energy as possible is absorbed by deformation of the shock-absorbing part 200, thereby safely protecting passengers.

The contact area between the reinforcement part 100 and the shock-absorbing part 200 is increased by the coupling between the coupling protrusion 110 and the coupling recess 210. Therefore, when the reinforcement part 100 and the shock-absorbing part 200 are engaged with each other using an adhesive, the engagement force may be enhanced in proportion to the increase in the contact area.

When the shock energy generated by an external collision is transmitted from the outer panel 10 to the shock-absorbing part 200, eccentricity and a consequent vertical moment may be generated. At this time, the locking structure formed by the coupling between the coupling protrusion 110 and the coupling recess 210 may prevent the shock-absorbing part 200 from being moved out of the partition space 32 defined by the reinforcement part 100 and the inner panel 20.

Accordingly, sufficient structural rigidity may be secured, the shock energy may be effectively dispersed from the reinforcement part 100 to the shock-absorbing part 200, and as much shock energy as possible may be absorbed by the shock-absorbing part 200.

Like the reinforcement part 100, the shock-absorbing part 200 is formed of a composite material including reinforced fiber and resin. The reinforced fiber may include at least one of carbon fiber, glass fiber and natural fiber. However, the embodiment is not limited thereto. The resin may include at least one of thermosetting resin and thermoplastic resin.

The shock-absorbing part 200 according to the embodiment of the present invention may be formed to be hollow such that an independent space 40 is formed therein. A support part 300 may be formed in the independent space 40 such that the support part 300 extends from the shock-absorbing part 200 and divides the independent space 40 into a plurality of unit spaces.

In detail, the shock-absorbing part 200 may have a hollow shape to form a space therein, and may be connected with a support part 300, which is provided in the space in the shock-absorbing part 200 to enhance the rigidity of the shock-absorbing part 200 and to prevent the shock-absorbing part 200 from being deformed by shock energy. The support part 300 may be integrally or monolithically formed with the shock-absorbing part 200, and may extend while the extension length of the shock-absorbing part 200 to divide the independent space 40 in the shock-absorbing part 200 along the direction in which it extends. Further, the support part 300 may be formed of a same material as the shock-absorbing part 200.

Described in more detail, the shock-absorbing part 200 may include a first inner surface 220, which may have an indented portion extending in the inward direction of the independent space 40 corresponding to the coupling recess 210, a second inner surface, which is positioned opposite to the first inner surface 220 while being spaced apart from the first inner surface 220 toward the inner panel 20, and a pair of connection inner surfaces 240, which connect two opposing ends of the first inner surface 220 and two opposing ends of the second inner surface, thereby forming the independent space 40. The support part 300 may include a first support body 310, which connects the indented portion formed in the first inner surface 220 and the second surface facing the indented portion, and a second support body 320, which intersects the first support body 310 and connects the pair of connection inner surfaces 240.

The first inner surface 220 of the hollow shock-absorbing part 200 is an inner surface on a first side of the shock-absorbing part 200, which is connected to the reinforcement part 100 through the coupling between the coupling protrusion 110 and the coupling recess 210, and may have an indented portion extending in the inward direction corresponding to the coupling recess 210.

The second inner surface is an inner surface on the opposite side of the shock-absorbing part 200, which is supported by the inner surface of the inner panel 20, and is positioned opposite to the first inner surface 220 at a predetermined distance apart from the first inner surface 220 toward the inner panel 20.

The pair of connection inner surfaces 240 connects the two opposing ends of the first inner surface 220 and the two opposing ends of the second inner surface. More particularly, the pair of connection inner surfaces 240 connects the upper and lower ends of the first inner surface 220 and the upper and lower ends of the second inner surface, thereby forming the independent space 40.

The first support body 310 connects the indented portion formed in the first inner surface 220 and the second surface facing the indented portion while extending across the independent space 40 in the horizontal direction, thereby dividing the independent space 40 in the vertical direction. Therefore, the first support body 310 may function to support the shock-absorbing body from an inside against shock energy generated in the event of a lateral collision, and may also serve as a shock energy moving path so that shock energy moves through the first support body 310 via the coupling protrusion 110 and the coupling recess 210.

The second support body 320 intersects the first support body 310 to connect the pair of connection inner surfaces 240, and extends across the independent space 40 in the vertical direction, thereby dividing the independent space 40 in the horizontal direction. The second support body 320 may serve as a shock energy moving path so that shock energy also moves through the second support body 320 via the intersection portion with the first support body 310.

Alternatively, the support part 300 may include a third support body and a fourth support body, which intersect each other and are arranged such that the ends of the third support body and the ends of the fourth support body are connected to four corners formed by the first inner surface 220, the second inner surface and the pair of connection inner surfaces 240.

The shock-absorbing part 200 may be formed in the shape of a tube having a predetermined section and extending along a longitudinal direction of the outer panel 10, the inner panel 20 and the reinforcement part 100, and the outer surface on a first side thereof may contact the inner surface of the reinforcement part 100, and the outer surface on the opposite side thereof may contact the inner surface of the inner panel 20.

The shock-absorbing part 200 may be formed in the shape of a hollow tube having two open ends, like the shape formed by the connection of the outer panel 10 and the inner panel 20, and may extend along a longitudinal direction of the outer panel 10, the inner panel 20 and the reinforcement part 100.

The outer surface of a first side of the shock-absorbing part 200, in which the coupling recess 210 is formed, contacts the inner surface of the reinforcement part 100, on which the coupling protrusion 110 is formed. The outer surface of the opposite side of the shock-absorbing part 200, which is supported by the inner panel 20, contacts the inner surface of the inner panel 20. Accordingly, the contact area with the partition space 32 is increased, and consequently the shock-absorbing part 200 may be prevented from being separated from the partition space 32 in the event of a collision.

The support part 300 may be structured such that a plurality of panels is integrally or monolithically formed while intersecting each other. The support part 300 may extend along a longitudinal direction of the outer panel 10, the inner panel 20 and the reinforcement part 100, and the ends of the support part 300 may be connected to the inner surfaces of the shock-absorbing part 200.

Like the shock-absorbing part 200, the support part 300, which is configured as a plurality of panels arranged to intersect each other, may extend along a longitudinal direction of the outer panel 10, the inner panel 20 and the reinforcement part 100. The respective ends of the support part 300 may be connected integrally or monolithically with the inner surfaces of the shock-absorbing part 200 such that the sectional shape of one region of the shock-absorbing unit is a same as that of any other region of the shock-absorbing unit when cut perpendicular to a longitudinal direction in which the shock-absorbing unit extends.

To this end, the shock-absorbing part 200 and the support part 300, formed integrally or monolithically with the inner surfaces of the shock-absorbing part 200, may be produced through a drawing process using reinforced fiber and resin. Therefore, a time taken for production is shortened, and thus productivity is enhanced. Further, since the reinforced fiber, arranged along a longitudinal direction of the shock-absorbing part 200, is formed to be continuous without interruption, it is possible to produce a shock-absorbing unit configured for satisfying desired mechanical properties.

The shock-absorbing unit according to an exemplary embodiment of the present invention may further include a reinforcement panel 400, which is connected to the connection portion between the outer panel 10 and the inner panel 20 and to the outer surface of the reinforcement part 100.

The reinforcement panel 400 may be formed in a panel shape like the reinforcement part 100. The inner and outer surfaces of a first end portion of the reinforcement panel 400 may be bonded to the connection portion between the outer panel 10 and the inner panel 20 using an adhesive, and the inner surfaces of the middle portion and the opposite end portion thereof may be bonded to the outer surface of the reinforcement part 100 using an adhesive, thereby enhancing the coupling force between the reinforcement part 100, the outer panel 10 and the inner panel 20.

Figure 3:
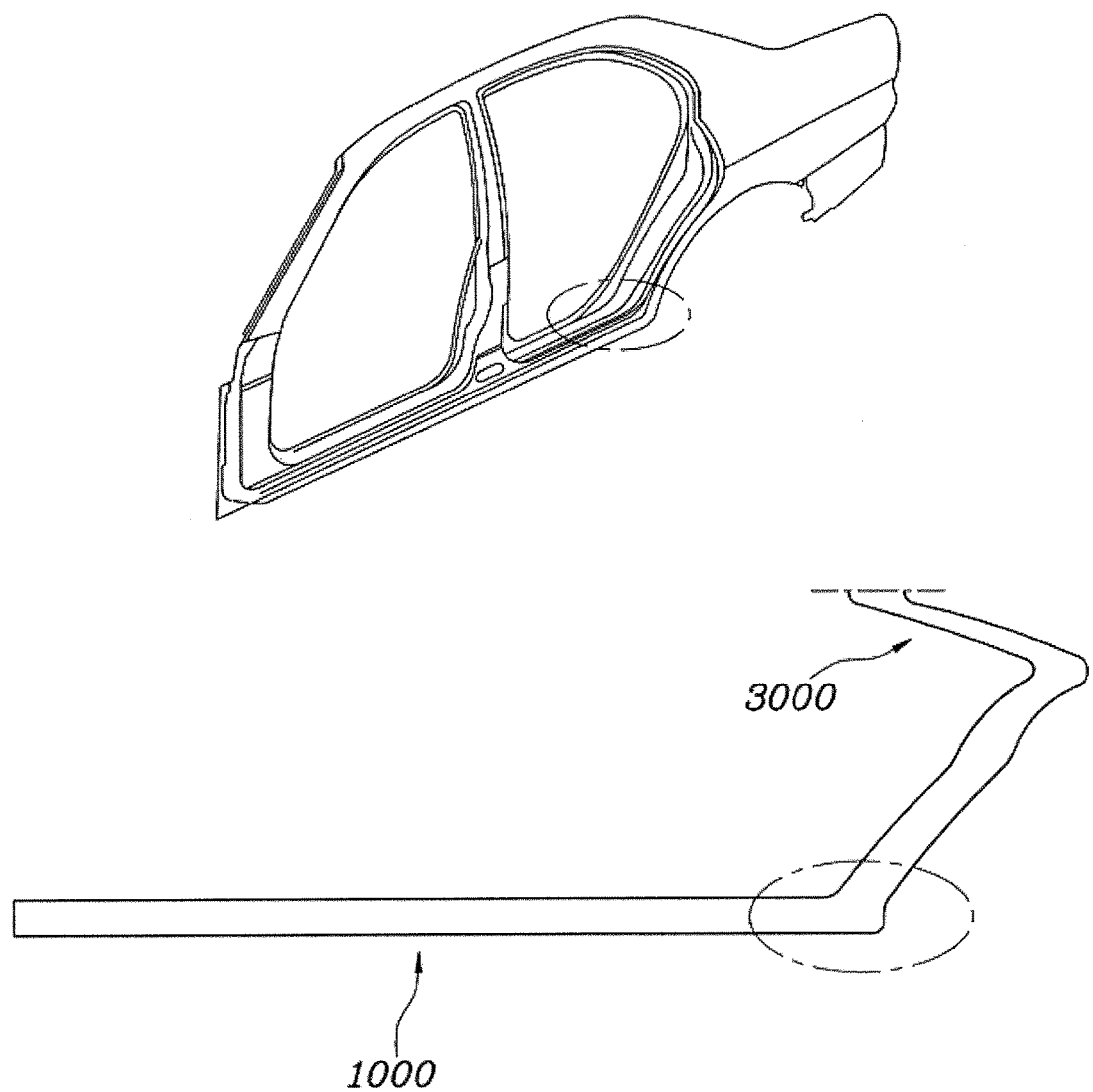
FIG. 3 is a view showing the appearances of a first member and a second member according to one embodiment of the present invention.
Figure 4:
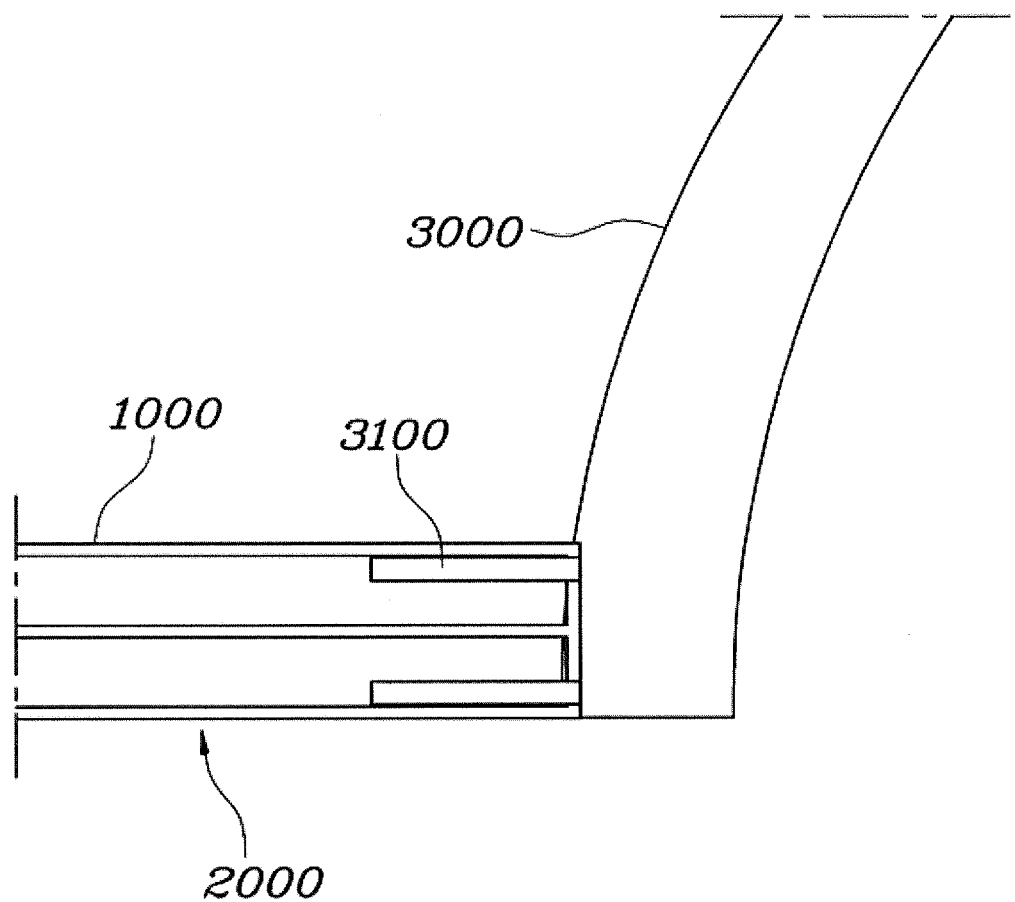
FIG. 4 is a view showing the internal connection structure of the first member and the second member according to one embodiment of the present invention.
Figure 5:
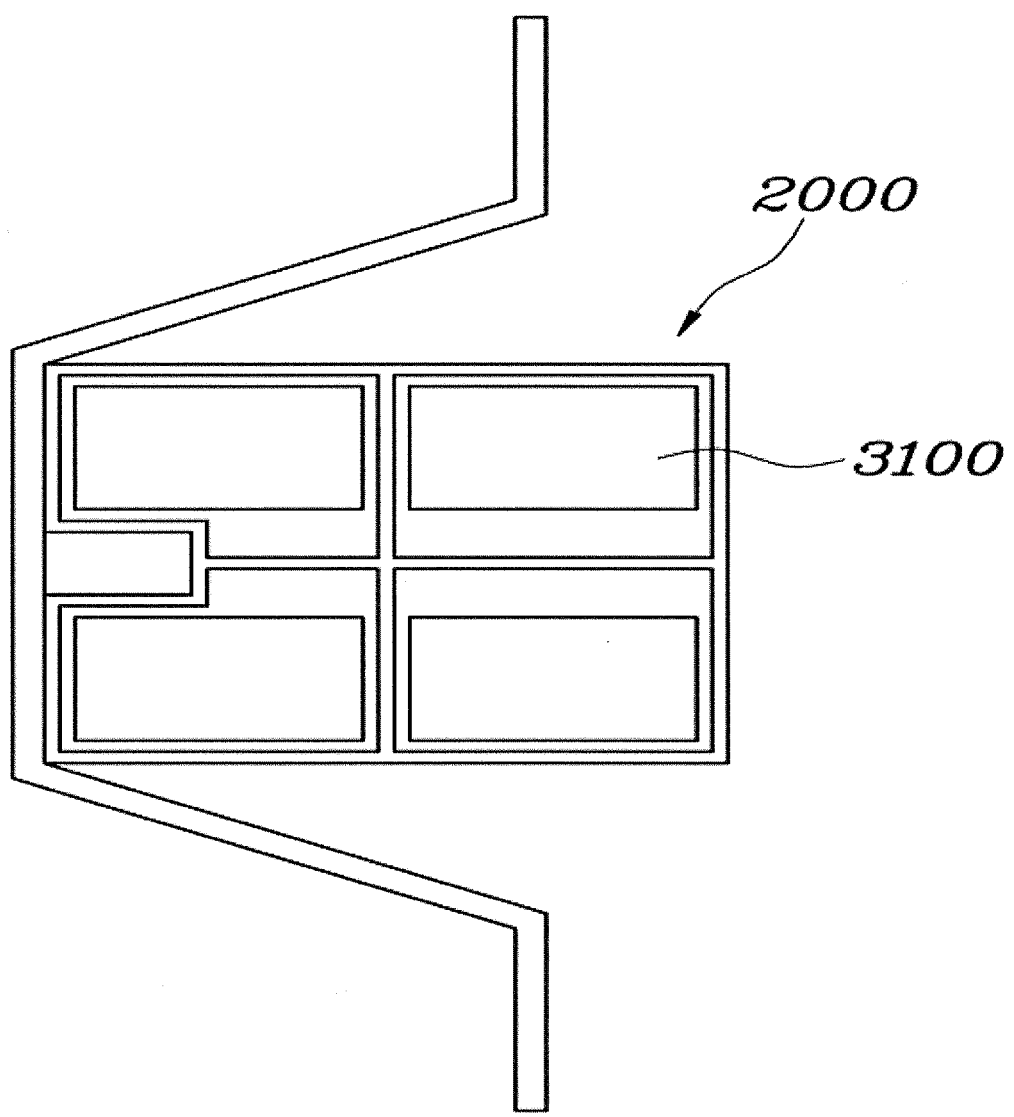
FIG. 5 is a view showing fastening portions secured into an independent space according to one embodiment of the present invention.

Referring to FIGS. 3 to 5, a member connection structure according to an exemplary embodiment of the present invention includes: a first member 1000, which includes an outer panel 10 and an inner panel 20 and may have an inner space 30 defined by the outer panel 10 and the inner panel 20; a shock-absorbing unit 2000, which includes a reinforcement part 100, which may have a panel shape and is made of a composite material, two opposing end portions of which are connected to the inner panel 20 to divide the inner space 30 of the first member 1000 into a separation space 31 adjacent to the outer panel 10 and a partition space 32 adjacent to the inner panel 20, and which may have a coupling protrusion 110 protruding from the inner surface thereof toward the inner panel 20, a shock-absorbing part 200, which is made of a composite material and may have a coupling recess 210 formed to receive the coupling protrusion 110 to be connected to the reinforcement part 100 in the partition space 32 and which is hollow to form an independent space 40 therein, and a support part 300, which is disposed in the independent space 40 and is connected integrally or monolithically with the shock-absorbing part 200 to divide the independent space 40 into a plurality of unit spaces; and a second member 3000, which may have a plurality of fastening portions 3100 formed at a first end portion thereof and is connected to the first member 1000 such that the each of the fastening portions 3100 is inserted into a corresponding one of the unit spaces into which the independent space 40 is divided.

The fastening portions 3100 may be in contact with the inner surfaces of the shock-absorbing part 200 and the support part 300 and secured thereto using an adhesive.

As illustrated in FIG. 3, the first member 1000, which is formed by the outer panel 10 and the inner panel 20, may constitute a member of the vehicle and, more, may constitute a side sill, which may have a space formed therein and is required to be connected to other members.

In the case in which the first member 1000 is applied to the vehicle made of a metal material, such as, for example, steel, aluminum or magnesium, a shock-absorbing unit may be provided in the inner space 30 to absorb the shock that is applied to the first member 1000 when the vehicle is involved in a collision. Since the coupling between the coupling protrusion 110 formed in the reinforcement part 100 and the coupling recess 210 formed in the shock-absorbing part 200 increases the contact area between the reinforcement part 100 and the shock-absorbing part 200 and enhances resistance to the moment generated by the collision, the shock-absorbing unit 2000 is configured for dispersing shock energy.

The second member 3000 is connected to the first member 1000 such that the each of the fastening portions 3100 provided at a first end portion of the second member 3000 is inserted into a corresponding one of the unit spaces, into which the independent space 40 is divided by the support part 300 in the shock-absorbing part 200. Accordingly, when the vehicle is in a collision, the second member 3000 may serve as a load path for the shock energy that is transmitted from the front or rear portion. Further, in the event of a lateral collision, the shock-absorbing unit 2000 may reduce lateral intrusion into the passenger compartment, and shock energy may be transmitted to the fastening portions 3100 and dispersed to the second member 3000.

When the each of the fastening portions 3100 is inserted into a corresponding one of the unit spaces formed by dividing the independent space 40, the fastening portions 3100 are contacted and secured to the inner surfaces of the shock-absorbing part 200 and the support part 300 using an adhesive, thereby enhancing the coupling force between the first member 1000 and the second member 3000 and inducing the dispersion of shock energy to the second member 3000. Further, assembly tolerance may be reduced.

Alternately, the fastening portions 3100 may be bonded and coupled to the shock-absorbing unit 2000 through insert coupling in the manufacture of the shock-absorbing unit 2000.

A method of manufacturing the shock-absorbing unit, which is disposed in the inner space 30 defined by the outer panel 10 and the inner panel 20, according to an exemplary embodiment of the present invention includes: a first forming step of forming a reinforcement part 100 of a composite material using reinforced fiber and resin so that the reinforcement part 100 may have a panel shape and may have a coupling protrusion 110 protruding from the inner surface thereof; a second forming step of integrally or monolithically forming a shock-absorbing part 200 of a composite material, so that the shock-absorbing part 200 may have a coupling recess 210 formed to receive the coupling protrusion 110 and is hollow to form an independent space 40 therein, and a support part 300 disposed in the independent space 40 and connected integrally or monolithically with the shock-absorbing part 200 to divide the independent space 40 into a plurality of unit spaces; and a fastening step of coupling the reinforcement part 100 and the shock-absorbing part 200 through coupling between the coupling protrusion 110 and the coupling recess 210.

The first forming step is to form the panel-shaped reinforcement part 100 using reinforced fiber and resin, which may have the coupling protrusion 110 formed in the inner surface thereof. The reinforcement part 100 may be formed by molding a prepreg, which is pre-impregnated with resin, or may be formed by processes of placing a preform in a mold and injecting a resin into the mold.

The second forming step is to form the shock-absorbing part 200 of a composite material using reinforced fiber and resin so that the shock-absorbing part 200 may have the coupling recess 210 formed to receive the coupling protrusion 110 and is hollow to form the independent space 40 therein, and is to form the support part 300, which is disposed in the independent space 40 and is connected integrally or monolithically with the shock-absorbing part 200 to divide the independent space 40 into a plurality of unit spaces. The second forming step may include a drawing step of drawing reinforced fiber so that the sectional shape made by the shock-absorbing part 200 and the support part 300 is uniform, and an impregnation step of impregnating resin into the drawn reinforced fiber.

As such, by forming the shock-absorbing part 200 and the support part 300 through a drawing process, productivity may be enhanced. Further, since the reinforced fiber is arranged continuously along a longitudinal direction of the shock-absorbing part 200 and the support part 300, there is an advantage in that mechanical properties are superior.

After the second forming step is completed, a step of assembling the reinforcement part 100, which is formed through the first forming step, and the shock-absorbing part 200, to which the support part 300 is integrally or monolithically connected, may be performed through coupling between the coupling protrusion 110 and the coupling recess 210.

As is apparent from the above description, the present invention provides a shock-absorbing unit, which is configured for increasing the coupling force between components using the coupling between a coupling recess and a coupling protrusion, and which is configured for absorbing shock energy.

Further, since it is possible to produce a shock-absorbing unit having a uniform sectional shape through a drawing process using reinforced fiber and resin, a time taken for production is shortened, and thus productivity is enhanced. Furthermore, since the reinforced fiber arranged along a longitudinal direction of the shock-absorbing unit is formed to be continuous without interruption, it is possible to produce a shock-absorbing unit configured for satisfying desired mechanical properties.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock-absorbing unit disposed in an inner space defined by an outer panel and an inner panel, the shock-absorbing unit comprising:

a reinforcement part made of a composite material, the reinforcement part having a panel shape, having two opposing end portions connected to the inner panel to divide the inner space into a separation space adjacent to the outer panel and a partition space adjacent to the inner panel, and having a coupling protrusion protruding from an inner surface thereof toward the inner panel;

a shock-absorbing part made of a composite material, the shock-absorbing part having a coupling recess formed in a first side thereof to receive the coupling protrusion to be connected to the reinforcement part in the partition space and having an opposite side connected to an inner surface of the inner panel to be supported by the inner panel; and a reinforcement panel connected to a connection portion between the outer panel and the inner panel and to an outer surface of the reinforcement part.

2. The shock-absorbing unit according to claim 1, wherein the shock-absorbing part is hollow to form an independent space therein, and the shock-absorbing unit further comprises a support part disposed in the independent space and connected integrally with the shock-absorbing part to divide the independent space into unit spaces.

3. The shock-absorbing unit according to claim 2, wherein the shock-absorbing part includes:

a first inner surface having an indented portion extending in an inward direction of the independent space corresponding to the coupling recess;

a second inner surface positioned opposite to the first inner surface 220 while being spaced apart from the first inner surface toward the inner panel; and a pair of connection inner surfaces connecting two opposing ends of the first inner surface and two opposing ends of the second inner surface to form the independent space.

4. The shock-absorbing unit according to claim 3, wherein the support part includes:

a first support body connecting the indented portion in the first inner surface and the second surface facing the indented portion; and a second support body intersecting the first support body and connecting the pair of connection inner surfaces.

5. The shock-absorbing unit according to claim 2, wherein the shock-absorbing part is formed in a tube shape having a predetermined section, extends along a longitudinal direction of the outer panel, the inner panel and the reinforcement part, and has a first side having an outer surface contacting an inner surface of the reinforcement part and an opposite side having an outer surface contacting an inner surface of the inner panel.

6. The shock-absorbing unit according to claim 5, wherein the support part is configured as a plurality of panels arranged to intersect each other, extends along a longitudinal direction of the outer panel, the inner panel and the reinforcement part, and has ends connected to inner surfaces of the shock-absorbing part.

7. A member connection structure comprising:

a first member including an outer panel, an inner panel, and an inner space defined by the outer panel and the inner panel;

a shock-absorbing unit including a reinforcement part made of a composite material, the reinforcement part having a panel shape, having two opposing end portions connected to the inner panel to divide the inner space of the first member into a separation space adjacent to the outer panel and a partition space adjacent to the inner panel, and having a coupling protrusion protruding from an inner surface thereof toward the inner panel, a shock-absorbing part made of a composite material, the shock-absorbing part having a coupling recess formed to receive the coupling protrusion to be connected to the reinforcement part in the partition space and being hollow to form an independent space therein, and a support part disposed in the independent space and connected integrally with the shock-absorbing part to divide the independent space into unit spaces; and a second member having a plurality of fastening portions formed at a first end portion thereof and connected to the first member such that each of the fastening portions is inserted into a corresponding one of the unit spaces.

8. The member connection structure according to claim 7, wherein the fastening portions are contacted and secured to inner surfaces of the shock-absorbing part and the support part using an adhesive.

9. A method of manufacturing a shock-absorbing unit disposed in an inner space defined by an outer panel and an inner panel, the method comprising:

forming a reinforcement part of a composite material using reinforced fiber and resin so that the reinforcement part has a panel shape and has a coupling protrusion protruding from an inner surface thereof;

integrally forming a shock-absorbing part of a composite material so that the shock-absorbing part has a coupling recess formed to receive the coupling protrusion and is hollow to form an independent space therein, and a support part disposed in the independent space and connected integrally with the shock-absorbing part to divide the independent space into unit spaces; and coupling the reinforcement part and the shock-absorbing part through coupling between the coupling protrusion and the coupling recess.

10. The method according to claim 9, wherein the integrally forming includes:

drawing reinforced fiber so that a sectional shape made by the shock-absorbing part and the support part is uniform; and impregnating resin into the drawn reinforced fiber.

* * * * *